United States Patent [19]
Ben-Yoseph et al.

[11] Patent Number: 5,949,439
[45] Date of Patent: Sep. 7, 1999

[54] COMPUTING APPARATUS AND OPERATING METHOD USING SOFTWARE QUEUES TO IMPROVE GRAPHICS PERFORMANCE

[75] Inventors: Roey Ben-Yoseph, Oakland; Paul Hsieh, San Jose; Wade K. Smith, Sunnyvale, all of Calif.

[73] Assignee: Chromatic Research, Inc., Sunnyvale, Calif.

[21] Appl. No.: 08/698,366

[22] Filed: Aug. 15, 1996

[51] Int. Cl.$^6$ .................................................. G06F 15/16
[52] U.S. Cl. .......................... 345/503; 345/521; 345/512; 395/670
[58] Field of Search .................................... 345/501–506, 345/520–522, 526, 507, 186, 509, 515, 513, 512, 203; 395/670, 672, 674, 676, 677, 678, 651, 680, 681, 682, 872–877; 711/6, 100, 110, 147, 153, 170–173

[56] References Cited

U.S. PATENT DOCUMENTS

| | | | |
|---|---|---|---|
| 5,283,899 | 2/1994 | Cook et al. ............................ | 395/672 |
| 5,568,616 | 10/1996 | Narayanaswami .................. | 395/200.62 |
| 5,649,230 | 7/1997 | Lentz ..................................... | 395/872 |
| 5,655,112 | 8/1997 | MacInnis ............................... | 345/501 |
| 5,737,605 | 4/1998 | Cunningham et al. ................ | 395/670 |
| 5,771,383 | 6/1998 | Magee et al. .......................... | 395/680 |
| 5,794,016 | 8/1998 | Kelleher ................................ | 345/505 |

*Primary Examiner*—U. Chauhan
*Attorney, Agent, or Firm*—Skjerven, Morrill, MacPherson, Franklin & Friel LLP; Ken J. Koestner

[57] ABSTRACT

A software queue located in an offscreen portion of video memory is used as a large-capacity software queue for queuing messages to a graphics accelerator. Although the software queue is typically stored in a dynamic RAM (DRAM) memory, advantages of faster static RAM (SRAM) are achieved by shadowing some of the queuing information in SRAM. Usage of a large-capacity software queue in video DRAM memory and information shadowing in faster SRAM memory achieves an advantageous balance between throughput speed and queue size. The large-capacity of the software queue ensures that the queue is virtually never filled to capacity so that delays while awaiting free space in the queue are virtually never incurred. The capacity of the software queue is determined in software and is therefore adaptable to match a particular graphics application.

25 Claims, 5 Drawing Sheets

COMPUTING APPARATUS AND OPERATING METHOD USING SOFTWARE QUEUES TO IMPROVE GRAPHICS PERFORMANCE

BACKGROUND OF THE INVENTION

1. Field of the Invention

The present invention relates to a multimedia computing system and operating method. More specifically, the present invention relates to an apparatus and technique for queuing messages from a host computer for usage by an accelerator in a multimedia computing system.

2. Description of the Related Art

Multimedia computer systems often include hardware accelerators to improve performance of media displays and other output devices. One common hardware accelerator is a graphics accelerator. A graphics accelerator is a hardware device dedicated to increasing the speed and performance of graphics. Graphics accelerators implement I/O-bound or computation-intensive tasks such as blits, polygons and text rasterization, freeing a central processing unit in a multimedia computer system for other operations.

Graphics accelerators generally include a form of hardware first-in-first-out (FIFO) buffer. Host requests to the accelerator pass through the FIFO. The hardware FIFO is usually small, on the order of 4 to 16 messages in depth. Disadvantageously, a typical FIFO requires that controller controlling the FIFO to perform a side read operation to determine whether the FIFO is full. Often, a host read of an accelerator status register causes pipeline flushing and incurs a wait state, a system overhead which results in a substantial degradation of system performance.

A hardware FIFO is typically implemented either as a plurality of hardware registers within the accelerator or as hard-defined memory elements in a static RAM (SRAM) memory to attain a suitable operating speed. Both hardware registers and SRAM cells consume a relatively large circuit area so that a substantial increase in the number of entries within the FIFO is not desirable from the perspective of cost and circuit size. Furthermore, both hardware registers and dedicated SRAM use circuit space for only the single purpose of message queuing. Due to these size constraints, a typical FIFO in a graphics accelerator has a small capacity so that the queue is often filled and delays are incurred while waiting for available space in a full queue.

Accordingly, in a conventional graphics accelerator, a small FIFO size and substantial overhead incurred to achieve read synchronization severely degrade system performance.

SUMMARY OF THE INVENTION

In accordance with the present invention, a software queue located in an offscreen portion of video memory is used as a large-capacity software queue for queuing messages to a graphics accelerator. Although the software queue is typically stored in a dynamic RAM (DRAM) memory, advantages of faster static RAM (SRAM) are achieved by shadowing some of the queuing information in SRAM. Usage of a large-capacity software queue in video DRAM memory and information shadowing in faster SRAM memory achieves an advantageous balance between throughput speed and queue size. The large-capacity of the software queue ensures that the queue is virtually never filled to capacity so that delays while awaiting free space in the queue are virtually never incurred. The capacity of the software queue is determined in software and is therefore adaptable to match a particular graphics application.

The described apparatus and operating method achieves several substantial advantages over the conventional usage of hardware FIFO for queuing messages to a graphics accelerator. One advantage is a capability to easily tune the size of a queue to a highly effective size, as needed. The queue is easily tuned through flexible software configuration operations to a very large size for high data throughput. For high data volume operations, a large queue is highly advantageous for improving accelerator throughput. The queue is reduced to a very small size or eliminated if data communication performance is not important to a particular application. The described apparatus and method advantageously synchronizes operations of a host processor and accelerator with significantly reduced synchronization penalties. The software queue and operating method achieves the synchronization advantages by implementing a fast local shadow copy of a queue readpointer in storage on the host side of the queue. The shadow copy is only updated when the queue appears to be full. Thus, the frequency of actual read operations of the queue readpointer is reduced to once per queue rollover. Thus, the described apparatus and operating method synchronizes most messages in the queue without reading from the queue over a bus. By avoiding synchronization penalties, the described apparatus and operating method advantageously improves the latency of message transfer while sustaining no penalty in processing speed. Another advantage is that the described apparatus and method easily determines the condition of the queue, whether under capacity or at capacity, without reading from the queue at each update. The software queue and software queue operating method achieves the queue size advantages by furnishing a queue structure that is easily configured to a suitable size, the size depending on a particular graphics application.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
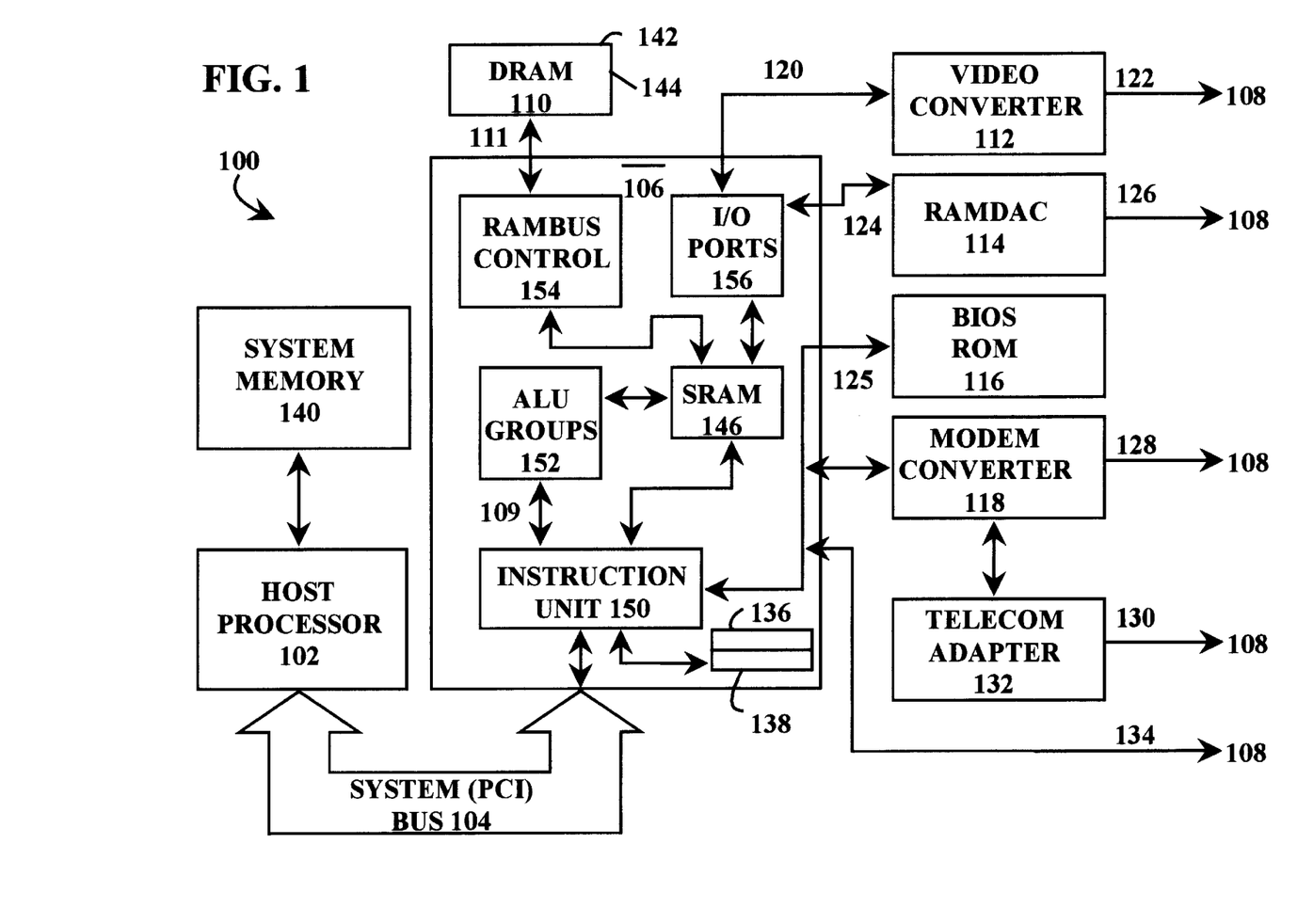
FIG. 1 is a schematic block diagram showing a computer system including high performance multimedia functionality.

Referring to FIG. 1, a schematic block diagram shows a computer system 100 that includes high performance multimedia functionality. The computer system 100 includes a host processor 102, a system bus 104, a multimedia processor 106 which is connected to the host processor 102 by the system bus 104, and a plurality of performance devices 108 which are driven by the multimedia processor 106 under control of the host processor 102.

In one embodiment, the host processor 102 is a Pentium™ or Pentium Pro™ (P6)×86 microprocessor running a Windows 95™ operating system. The computer system 100 executes software including a resource manager based in the host processor 102, a real-timer kernel based in the multimedia processor 106 and various device drivers for individual devices.

In the illustrative embodiment, the multimedia processor 106 is a proprietary special-purpose processor designed by Chromatic Research, Inc., Sunnyvale, Calif. called an Mpact media engine. The multimedia processor 106 interfaces to a host processor 102 in a multimedia computer system 100 to supply functionality including digital video encoding, decoding and playback acceleration, superVGA 2D graphics acceleration, 3D graphics acceleration, CD-quality stereo audio and realistic sound effects, FAX/modem capabilities, a range of telephony options and desktop videoconferencing. The multimedia processor 106 includes a static RAM (SRAM) 146 for storing both instructions and data, an instruction unit 150, five function units called ALU groups 152, a Rambus controller 154, and I/O port controllers 156. The multimedia processor 106 is connected to a high-speed (500 MB-per-second) Rambus DRAM memory and includes a 792-bit internal data path 109 for handling large volumes of multimedia data, such as video image data, to achieve an enormous data throughput of an estimated 2 billion integer operations per second. The 792-bit internal data path is fed by eleven 72-bit wide output terminals from various processing unit groups and the SRAM read ports arranged in parallel. In contrast, the Pentium Pro™ (P6)×86 has a substantially smaller 64-bit data path and an operation rate of 200 million integer operations per second. The multimedia processor 106 uses a Very Long Instruction Word (VLIW) technology, vector processing, and single-instruction multiple data (SIMD) technology to achieve extensive parallel operation.

The multimedia processor 106 operates under control of a real-time multitasking kernel and simultaneously addresses the five semi-independent, quasi-specialized execution units 152. The multimedia processor 106 transmits and receives data simultaneously over a high-speed Rambus DRAM channel I/O bus at up to 500 megabytes per second (MB/s) and other buses, including a PC bus operating at 120 Mb/s, so that the multimedia processor 106 never waits to send or receive data between peripherals, the system bus 104, or the Rambus DRAM memory 110. Also simultaneous with the operation of the high-speed I/O bus, the 792-bit-wide internal data path moves up to 8 billion integers per second between hundreds of arithmetic logic units working in parallel to achieve 2 billion integer operations per second for most functions, and up to 20 billion integer operations per second for a time-critical motion estimation function used in video encoding and videoconferencing.

The multimedia processor 106 fetches instruction words on every clock cycle. Each instruction word contains two instructions or opcodes. Each opcode operates on 2 to 16 integers simultaneously, enabling as many as 32 integer operations to occur in parallel for each clock cycle. Vector instructions can automatically perform multicycle operations on an array of operands, achieving improved efficiency in comparison to execution of the operations in traditional program loops.

The multimedia processor 106 is a single, multiple-function, multimedia processor that performs multiple functions that have conventionally been performed using separate fixed-function accelerators for graphics and audio functions. The multimedia processor 106 combines MPEG-1 encode and decode functionality, MPEG-2 decoding, and high-speed modem emulation with audio, video, graphics acceleration, and telephony features including speaker phone and video conferencing.

The multimedia processor 106 includes a programmable core (not shown) for performing multimedia data processing for executing the various audio, video, communications and graphics functions.

The multimedia processor 106 is connected to the host processor 102 by a system bus 104, in particular a personal computer interface (PCI) bus operating at a maximum bandwidth of 50 Mbyte/s. The multimedia processor 106 is connected to a Rambus DRAM memory 110, a video converter 112, a RAMDAC 114, a BIOS read-only memory (ROM) 116, and an audio stereo modem converter 118. The multimedia processor 106 is connected to the Rambus DRAM memory 110 by a 500 Mbyte/s Rambus interface 111. The video converter 112 is connected to the multimedia processor 106 by a video bus 120 carrying data at a 27 Mbyte/s rate and connected to a video display (not shown) by an analog video I/O line 122. The RAMDAC 114 is connected to the multimedia processor 106 by a display bus 124 carrying data at a 200 Mbyte/s rate and connected to an RGB monitor (not shown) by an RGB cable 126. The audio stereo modem converter 118 is connected to the BIOS ROM 116 as well as the multimedia processor 106 via a 2 Mbyte/s peripheral bus 125. The audio stereo modem converter 118 has external interfaces to an audio speaker (not shown) via a stereo audio I/O line 128 and to two RJ-11 telephone lines 130 via a telecom adapter 132. The multimedia processor 106 also includes a joystick interface 134. The peripheral bus 125 has 14 virtual access channels for communicating with peripherals. Microprogrammable channels 0 to B are controlled by external devices and are used for DMA at a total bandwidth of up to 5 MB/s. For DMA operations, an external signal triggers a micro-program that transfers data to or from an external device. The microprogrammable channels 0 to B are unidirectional and half-duplex and some are configured using either a parallel or serial interface. The parallel channels are highly programmable and support a wide variety of current CODECs or other peripherals. Channels C and D are controlled by register accesses from the system (PCI) bus 104 or the multimedia processor 106. Common transactions are resident in a microprogram control store memory (not shown) of the multimedia processor 106 to increase I/O throughput and to reduce service latency. Unusual transactions, such as error handling operations, are stored in Rambus DRAM memory 110 and loaded on demand into control store memory. Serial channels support a programmable protocol that directs a channel to transfer data based on clock and synchronization signals supplied by an external device, such as an audio CODEC. Channel C is dedicated to ROM and has a microprogram which is hard-wired to output a 24-bit address to the ROM, pause for the ROM access time, then read the data into a register. Channel D is a general-purpose, internally requested channel for writing control registers and reading status in external devices.

The Rambus DRAM memory 110 is a single high-speed multimedia memory buffer having typical capacity of 2 Mbyte or 4 Mbyte and serving as a central storage for all multimedia data and mediaware modules. The Rambus DRAM memory 110 communicates with the multimedia processor 106 using direct memory access (DMA), with the Rambus interface 111 moving data to and from the Rambus DRAM memory 110 on a microsecond-by-microsecond basis where the data is made available to the processor core of the multimedia processor 106.

The video converter 112 sends and receives 16-bit YUV video data and supports pixel scaling, color conversion and dithering. The video bus 120 and the peripheral bus 125 share an interface with the Rambus DRAM memory 110 with the video bus 120 having priority over the peripheral bus 125.

The RAMDAC 114 is used for displaying graphics and operates in response to graphic commands that originate from the host processor 102. Signals corresponding to the graphic commands are communicated to the multimedia processor 106 via the system bus 104 to drive a graphic monitor (not shown) via the RGB cable 126. In this manner, Windows-type graphics are displayed on the graphic monitor.

The BIOS ROM 116 supports a VESA video BIOS extension 2.0 at a resolution and color depth supported by the hardware.

The audio stereo modem converter 118 supports Modem and FAX up to 28,800 baud with support for speakerphone and simultaneous data and voice transmission.

The multimedia processor 106 reserves some storage in Rambus DRAM memory 110 for implementing a Readpointer 136 and a Writepointer 138. The Readpointer 136 and the Writepointer 138 are shadowed in a static RAM (SRAM) memory 146 by the multimedia processor 106 during execution of a graphics thread.

The computer system 100 includes a system memory 140, a video memory 142, the static RAM (SRAM) 146, and the Rambus DRAM memory 110. The Rambus DRAM memory 110 is physically incorporated onto a circuit board (not shown) that also physically holds the multimedia processor 106. The Rambus DRAM memory 110 is directly accessible and addressable by both the host processor 102 and the multimedia processor 106. The single 16 Mbit Rambus DRAM memory 110 serves as a multimedia core memory and generally includes either two or four megabytes of memory and transfers one byte every 2 ns, or one 72-bit word every 16 ns, giving rise to a 62.5-MHz core clock rate of the multimedia processor 106. Two DRAMs are used for MPEG-1 encoding or MPEG-2 decoding. The Rambus DRAM memory 110 is allocated to multiple functions such as a frame buffer memory, wavetable data buffers, modem data buffers, video memory, including off-screen video memory and off-screen bitmaps.

The SRAM 146 is multiported with connections to the system bus 104, the Rambus DRAM memory 110 via a 500 Mbyte/s Rambus interface 111, the 792-bit internal data path 109, the video bus 120 and the peripheral bus 125. The SRAM 146 is controlled completely by software with little hardware support. Software programs configure data and instruction areas of the SRAM 146. The 4 K SRAM 146 is organized into 51 272-bit words. Software partitions the SRAM 146 into instruction and data areas. The instruction area is configurable to 256, 512, or 1 K bytes. The instruction area is a direct-mapped cache with a 128-byte line size. The data area is self-managed, having the form of a scratchpad memory with no set line size.

A software queue 144 is defined and accessed to perform a software queue operation. The software queue 144 is used for communicating graphics information from the host processor 102 to the multimedia processor 106. More specifically, the software queue 144 communicates commands and requests from the host processor 102 to a graphics display via the multimedia processor 106. The commands and messages typically include an address or index into a memory and data that corresponds to the particular address or index. The address or index defines an operation that is to be executed by the multimedia processor 106. The data is operated upon by the defined operation. Examples of two-dimensional graphics operations include solid fill, pattern fill, color expansion, screen-to-screen copy, text, line draw, polygon draw operations and the like. Examples of three-dimensional graphics operations include rectangle fills, 3D spans and 3D geometric primitives such as lines, triangles and quadrilaterals. Other three-dimensional graphics operations include Z-buffering and double buffered rendering, texture heaps, allocating and bit-mapped textures, texture memory status, and textured primitives.

The software queue 144 is located in an offscreen portion of video memory 142. Positioning and sizing of the software queue 144 in the video memory 142 are highly advantageous for allowing the queue size to be tailored to needs of a particular graphic display operation. In particular, the software queue 144 may be defined to a very large size to accommodate the large amount of data that is commonly transferred in graphics operation. The software queue 144 is sized to a sufficient capacity to accommodate the information volume associated with occasional peak flows of graphic information. Typical defined sizes of the software queue 144 range from about 4 Kbytes to 63 Kbytes. The size of the software queue 144 is set in an entirely software-driven operation by runtime modification of global variables on the host processor 102. Advantageously, software queues are supplied through software modifications alone, without any hardware enhancement or modification. Because the software queues are entirely defined in software, operating parameters of the software queue are easily tuned to particular data communication conditions and applications.

Figure 2:
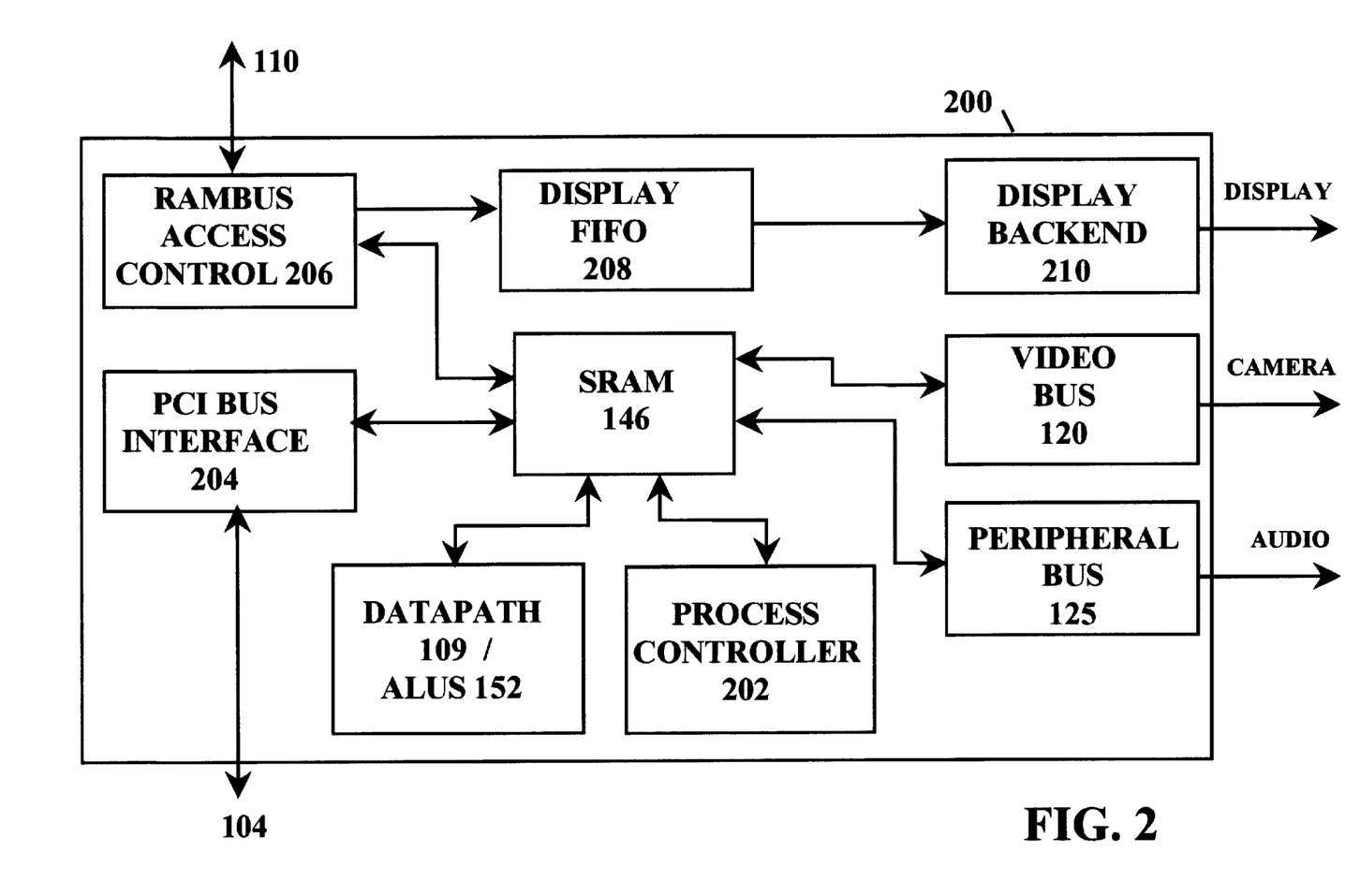
FIG. 2 is a schematic block diagram which depicts a multimedia buffer memory of the computer system shown in FIG. 1.

Referring to FIG. 2, a schematic block diagram illustrates the multimedia buffer memory 200. The multimedia buffer memory 200 has a central storage supplied by the SRAM 146. The SRAM 146 is connected to the 792-bit internal data path 109, and a process controller 202 which controls operations of the multimedia processor 106. The SRAM 146 is also connected to a television camera via the video bus 120 and connected to audio and modem peripherals via the peripheral bus 125. The SRAM 146 is connected to the system (PCI) bus 104 via a PCI bus interface 204. The SRAM 146 is connected to the Rambus DRAM memory 110 through a Rambus DRAM access controller 206. The Rambus DRAM access controller 206 drives display signals to a peripheral display through a display FIFO 208 and a display backend 210.

Figure 3:
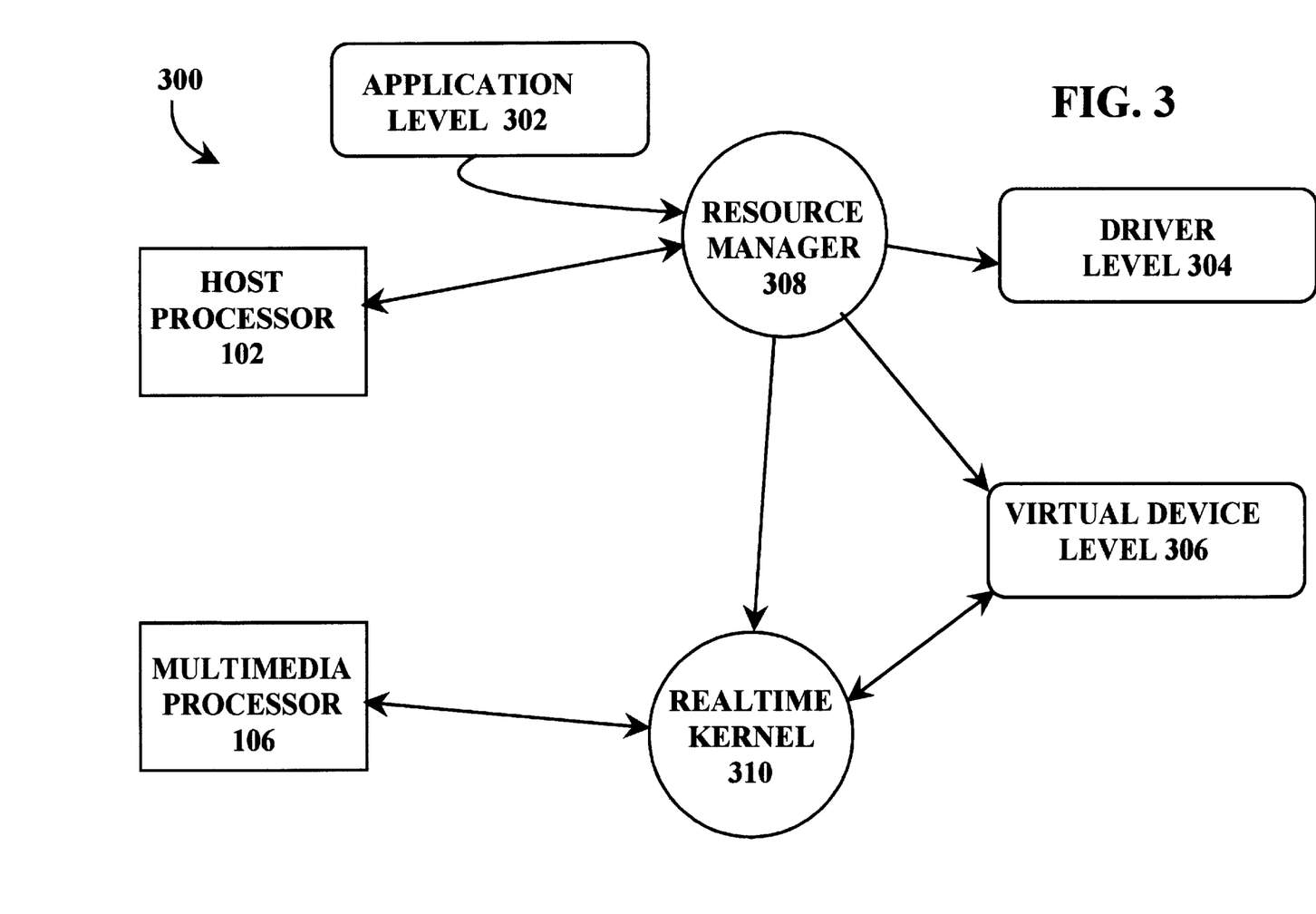
FIG. 3 is a schematic block diagram illustrating a high-level structure of a multiple-level software architecture operating on the computer system shown in FIG. 1.

Referring to FIG. 3 in conjunction with FIG. 1, a schematic block diagram illustrates a high-level structure of a multiple-level software architecture 300 operating on the computer system 100. The multiple-level software architecture 300 has three levels including an application 302, a driver level 304, and a virtual device level 306. The multiple-level software architecture 300 also includes a resource manager 308 executing in the host processor 102 and a real-time kernel 310 executing in the multimedia processor 106.

Device drivers in the driver level 304, which execute on the host processor 102, operate in accordance with application programming interface (API) standards defined for Windows™ applications and communicate with virtual devices of the virtual device level 306 through the real-time kernel 310. The device drivers of the virtual device level 306 also periodically communicate with the resource manager 308. Windows™ applications generally execute through standardized Windows™ driver interfaces, such as DirectX and GDI for graphics, TAPI.DLL for modems, and MMSYSTEM.DLL for multimedia.

The resource manager 308 manages the Rambus DRAM memory 110, maintains execution priorities, and configures block and direct-communication transfers.

The resource manager 308 also communicates with the real-time kernel 310. The real-time kernel 310 is a multi-tasking kernel that monitors interrupts and requests from both the drivers in the driver level 304 and hardware nodes operating from physical devices. The real-time kernel 310 allocates the SRAM 146 internal to the multimedia processor 106 and performs task switching and task synchronization. The real-time kernel 310 makes all devices appear independent to the drivers of the driver level 304 and maintains a real-time response by issuing priority to an event having the nearest deadline.

The multiple-level software architecture 300 in the host processor 102 and multimedia processor 106 operates in concert to balance the execution load between the host processor 102 and the multimedia processor 106. Generally, all possible instruction execution is directed to the multimedia processor 106, freeing the host processor 102 from extensive computations. If a heavy processing burden is imposed on the computer system 100 simultaneously, for example, a high-resolution graphics stream, a 28.8-kbps modem, and a demanding audio task, the multimedia processor 106 could be overloaded. In this case, the resource manager 308 shifts complex graphics operations, such as text acceleration, font caching, and solid fills, to the DIB engine driver on the host processor 102, reducing the load during burdensome operations.

Figure 4:
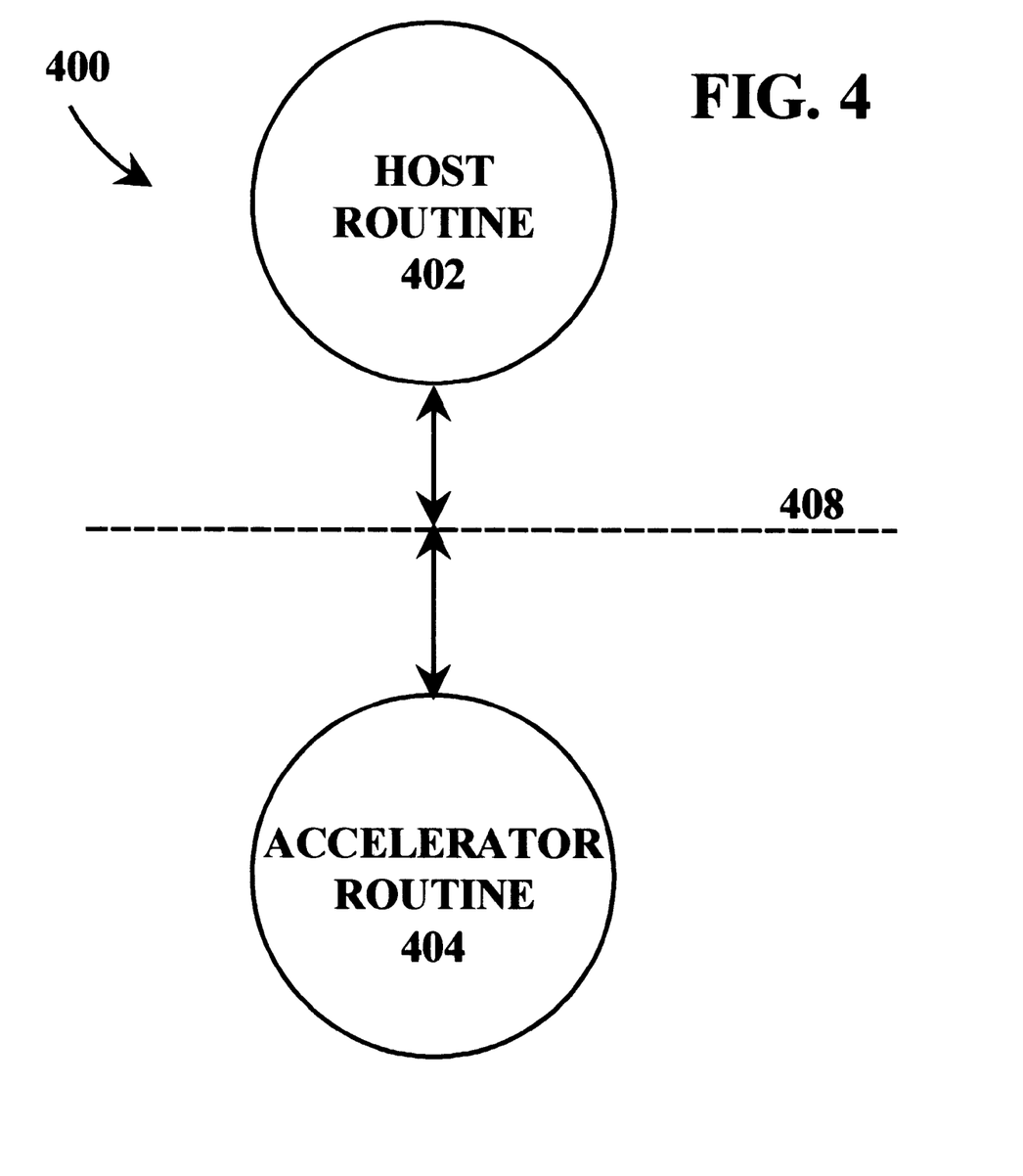
FIG. 4 is a schematic block diagram illustrating functional blocks of a software program implementing a software queue.

Referring to FIG. 4 in conjunction with FIG. 1, a schematic block diagram illustrates functional blocks of a software program implementing a software queue. The software queue program 400 is employed for controlling the software queue program 400 to improve the graphics-handling operation of the computer system 100. The software queue program 400 includes a host routine 402 executing on the host processor 102 and an accelerator dispatcher routine 404 executing on the multimedia processor 106. The host routine 402 and accelerator dispatcher routine 404 mutually communicate across a boundary, called a queue boundary 408. The host routine 402 generally implements functions that are not specific to multimedia operations, although a few host operations are specific to particular multimedia functions, such as graphic-specific operations that drive pixels to the graphic display. The host routine 402 performs the queue control operations of the software queue program 400. For example, the host routine 402 determines the operating size of the software queue 144 by designating the position of the software queue 144 in Rambus DRAM memory 110 and the total size of the software queue 144. The host processor 102 includes all intelligence of the software queue program 400, having control over the location and tuning of the software queue 144 through operations during initialization of the software queue 144, as well as control over activation and deactivation of the software queue 144.

In contrast, the accelerator dispatcher routine 404 merely responds to the requests made by the host routine 402, accessing messages from the software queue 144 when posted by the host routine 402, activating a program code operating in the multimedia processor 106 as directed by the message from the host routine 402, and autoincrementing the Readpointer 136. When the end of the software queue 144 is reached, the host routine 402 causes the Readpointer 136 to wrap around to the beginning of the software queue 144 by setting the Writepointer 138 to the queue beginning. The accelerator dispatcher routine 404 does not recognize the queue boundaries except as directed by the host routine 402.

The software queue program 400 controls and synchronizes graphic information flow in the software queue 144 using the Readpointer 136 and the Writepointer 138 to address entries of the software queue 144 operating as a circular buffer. The Writepointer 138 is solely controlled by the host processor 102. The Readpointer 136 is solely controlled by the multimedia processor 106. The host routine 402 updates the Writepointer 138 to designate a new posted message. The accelerator dispatcher routine 404 updates the Readpointer 136 to specify that a message has been consumed. In one embodiment, the host routine 402 maintains a shadow copy of the Readpointer 136 in the system memory 140 so that the actual Readpointer 136 is only read by the host processor 102 from video memory 142 when the software queue 144 is apparently full. The software queue 144 usually appears to be full only once through a transition of the entire capacity of the software queue 144. Usage of the shadow copy of the Readpointer 136 significantly reduces synchronization overhead. Advantageously, usage of the software queue 144 allows the overall graphics performance of the computer system 100 to be bound by the multimedia processor 106 computation bandwidth and the memory bandwidth, rather than by buffer size or synchronization overhead.

The software queue program 400 drives the communication of graphic information in a single direction, from the host processor 102 to the display via the multimedia processor 106. All new messages originate in the host processor 102. The host routine 402 initiates communication by performing a write operation and changing the Writepointer 138, thus informing the accelerator dispatcher routine 404 running on the multimedia processor 106 that a new message is available to be consumed by the multimedia processor 106. The multimedia processor 106 performs operations in response to messages in the software queue 144 in turn, reading each message packet, performing the operation directed by the message packet, and updating the Readpointer 136 at the conclusion of the operation performance. This single-direction message flow is advantageously simple, efficient and fast.

Figure 5:
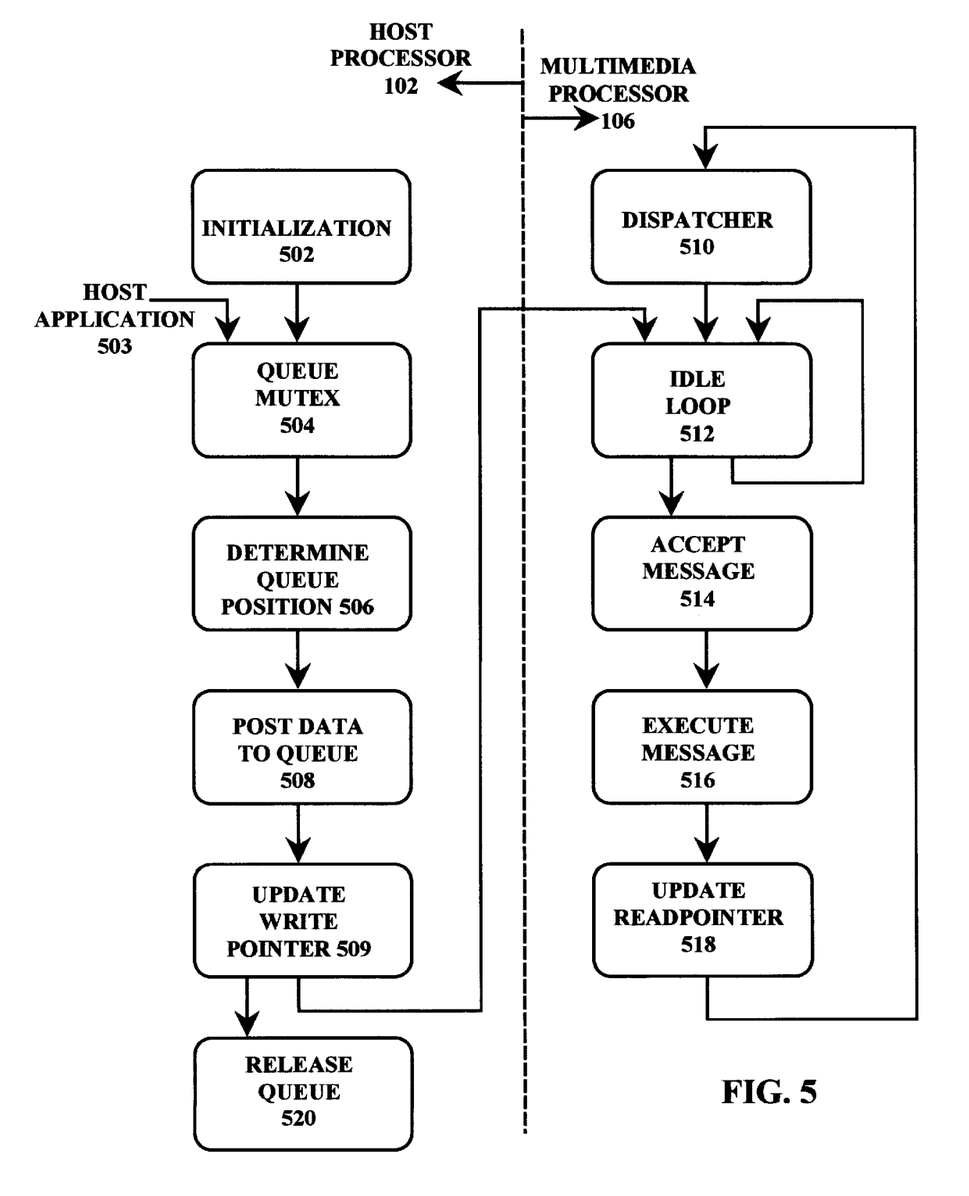
FIG. 5 is a flow chart describing operations of the software program implementing a software queue shown in FIG. 4.

Referring to FIG. 5, a flow chart illustrates operations of the software program implementing the software queue program 400. The software queue program 400 includes an initialization operation 502 for execution on the host processor 102. The initialization operation 502 first initializes a thread on the multimedia processor 106. The thread is a single process of the accelerator dispatcher routine 404 for controlling an independent dynamic action within a computer system. The system may have many simultaneous threads of control, some being dynamically created and some being dynamically terminated. Control threads are generally applicable to multiple-processor systems so that a single thread controls operations executing on a plurality of communicating processors. The initialization operation 502 initializes the thread executing on the multimedia processor 106 including initialization of the Readpointer 136 that is controlled by the multimedia processor 106. The initialization operation 502 also initializes variables that are used by the thread including setting of the location of the software queue program 400 in video memory 142, setting the location of the Readpointer 136 and the Writepointer 138 in the Rambus DRAM memory 110. In addition, the initialization operation 502 sets various information structures for synchronizing operations of the host routine 402 and the thread of the accelerator dispatcher routine 404.

Much of the initialization operation 502 operation involves initial synchronization of the host routine 402 and the accelerator dispatcher routine 404. Once initialization operation 502 is complete, the host routine 402 and accelerator dispatcher routine 404 generally remain in synchrony and communicate only through the software queue program 400.

Following the initialization operation 502, the communication of any message via the software queue 144 is initiated by a host routine 503 executing in the host processor 102. Multiple application programs may execute simultaneously in the host processor 102 and many of the application programs may transmit messages over the software queue 144. For example, individual active applications programs may include various programs executing two-dimensional graphics, three-dimensional graphics, direct screen write operations, MPEG operations and the like. Graphics operations include solid fills, pattern fills, monitor color expansion operations for text, screen-to-screen blit operations, various blit operations with rasterops enabled, and operations for merging source and destination data with patterns. Other operations include various types of output functions including lines, polygons, circles, ellipses and scans for implementing miscellaneous GDI output functions. Multiple programs potentially access the software queue 144 at the same time, so that the first operation following initialization operation 502 is a queue mutex step 504 of obtaining mutually exclusive access to the software queue 144, so that a particular application executing on the host processor 102 claims temporary ownership of the software queue 144. Once an application program has mutually exclusive access to the software queue 144, another application cannot access the software queue 144 until the queue is released.

In a determine queue position operation 506, the application program having access to the software queue 144 determines a location in the software queue 144 for loading the next message. Specifically, the determine queue position operation 506 accesses a readpointer storage and a writepointer storage. The readpointer storage is a storage in the system memory 140 which is readily accessible to routines operating in the host processor 102 and serves as a shadow storage for the Readpointer 136 in the Rambus DRAM memory 110. The writepointer storage is a storage in the system memory 140 which is readily accessible to routines operating in the host processor 102 and serves as a shadow storage for the Writepointer 138 in the Rambus DRAM memory 110. The determine queue position operation 506 compares the readpointer to the writepointer to determine whether free space is available in the software queue 144 for accepting the next message. If the readpointer is equal to the writepointer, then the software queue 144 is empty. If the writepointer plus the current message size is sufficiently large with respect to the readpointer that writing the message would overlap the storage indicated by the readpointer, then the software queue 144 is full and the current message is not written. Furthermore, the determine queue position operation 506 does not write the message to the software queue 144 if writing the message would exactly fill the software queue 144. At least one data unit is always left unfilled in the software queue 144. In one embodiment, the determine queue position operation 506 is implemented to prohibit the software queue 144 from filling completely so that a full queue condition is not interpreted as an empty queue condition.

The shadow versions of the readpointer and writepointer are compared because the actual Writepointer 138 and Readpointer 136 are held in the Rambus DRAM memory 110 and only read via the system bus 104. A read operation over the system PCI bus 104 involves a substantial delay in comparison to reading the shadow values directly from shadow storage that is local to the host processor 102. Thus, rather than reading the Readpointer 136 once per message, the host routine 402 may read the Readpointer 136 approximately once per traverse of the entire software queue 144, for example when the circular software queue 144 wraps around or when the readpointer and writepointer differ by an amount within a specified range. Usage of shadow versions of the readpointer and writepointer is proper because the shadow readpointer and shadow writepointer always describe a subqueue in which free areas are guaranteed to be free.

If the software queue 144 is not full, a post data to queue operation 508 activated through the application program having access to the software queue 144 writes the writepointer value to the Writepointer 138 in the multimedia processor 106 via the system bus 104 and writes the message directly to the software queue 144 in the multimedia processor 106 via the system bus 104.

The post data to queue operation 508 writes an index or address to the software queue 144 which identifies the operation to be performed and also passes other data directly to the software queue 144. For example, in the case of an operation such as solid fill, which is one of the most common operations requested in the Windows™ operating system, the message defines a region of the display to paint and designates the color to enter into the region. The message defines the region by passing a pointer to the top left corner of a box to be drawn in X, Y coordinates. The message then passes the size of the box in width and height and a designator of the color to be drawn. The final entry of the message is an index or address of the instruction code in the multimedia processor 106 for executing the solid fill operation. The accelerator dispatcher routine 404 operating on the multimedia processor 106 interprets the message and jumps to the designated program code location to perform an operation requested by the message.

An update writepointer operation 509 then updates the shadow writepointer in preparation for the next message to indicate that a new packet has been posted into the queue. The update writepointer operation 509 increments the pointer value and compares the updated value to the location of the final position in the software queue 144. The updated shadow writepointer extends beyond the software queue 144, the shadow writepointer value is set to the location of the beginning of the software queue 144. In this manner, the host routine 402 wraps around to the beginning of the software queue 144. The host processor 102 maintains a copy of the Readpointer 136, which is stored in memory of the multimedia processor 106, so that the host processor 102 reduces the number of data read operations across the system bus 104. Advantageously, the host processor 102 only reads the Readpointer 136 when the software queue 144 is apparently full, generally once per traverse of the software queue 144. Limiting the number of read operations across the system bus 104 significantly reduces the synchronization overhead.

The accelerator dispatcher routine 404 operating on the multimedia processor 106 includes a program code called a dispatcher 510 which loops in an idle loop 512, waiting in place for the receipt of a message from the host processor 102, which is indicated by a change in the Writepointer 138. When a message is posted to the queue and the Writepointer 138 changes value, an accept message operation 514 of the dispatcher 510 accesses the address or index posted in the software queue 144 and jumps to the posted address in the instruction code memory of the multimedia processor 106, thereby beginning servicing of the queued operation. The address designates the operation to be executed in response to the message. The accept message operation 514 also makes data in the software queue 144 accessible for usage during execution by the addressed instruction code. For example, in the example of the message calling for a solid fill operation, the accept message operation 514 accesses the index which designates the solid fill operation in the multimedia processor 106 instruction memory. The accept message operation 514 jumps to the solid fill instruction code which accesses additional information from the software queue 144 including the X, Y coordinates designating the position of the top left corner of the box of the display to be filled, the size of the box to be filled and the color.

An execute message operation 516 then executes the designated operation, in this example the solid fill operation, and returns to the dispatcher 510. When the operation code completes execution, a return directs operations back to the dispatcher 510 so that execution constantly shifts to and from the dispatcher 510. The dispatcher 510 then performs an update readpointer operation 518, modifying the Readpointer 136 to indicate that the operation is completed.

The operation of the software queue program 400, using the host routine 402 to update the Writepointer 138 after the host routine 402 has posted all message information and using the accelerator dispatcher routine 404 to update the Readpointer 136 after the operation designated by the message is completed, serves to interlock the operations of the host processor 102 and the multimedia processor 106, thereby tightly synchronizing the message communication and preventing the occurrence of a race condition.

When an application program executing on the host processor 102 is finished with the queue, the host routine 402 performs a release queue operation 520 that releases control of the software queue 144 for access by other applications.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments.

What is claimed is:

1. A computing apparatus comprising:
   a processor;
   an accelerator coupled to the processor;
   a central storage coupled to the processor without intermediate hardware FIFO buffering and controlled by the processor, the central storage also being coupled to the accelerator without intermediate hardware FIFO buffering; and
   a software routine including a processor routine executing on the processor and an accelerator dispatcher routine executing on the accelerator, the software routine further including:
   a configuration routine allocating a queue within the central storage;
   a message posting routine executing on the processor and writing a message to the queue; and
   a message consuming routine executing on the accelerator, reading a message from the queue, and activating the message for performance by the accelerator.

2. A computing apparatus according to claim 1, wherein the accelerator is a graphics accelerator.

3. A computing apparatus according to claim 1, further comprising:
   a writepointer coupled to the accelerator and controlled by the processor, the writepointer being updated by the processor routine to designate posting of a message from the processor to the accelerator via the queue; and
   a readpointer coupled to the accelerator and controlled by the accelerator, the readpointer being updated by the accelerator dispatcher routine to designate consumption of a message.

4. A computing apparatus according to claim 3, further comprising:
   a shadow writepointer stored in a storage coupled local to the processor, the shadow writepointer being updated by the processor routine to shadow the writepointer.

5. A computing apparatus according to claim 1, wherein the processor routine includes a routine that controls the queue as a circular queue.

6. A computing apparatus according to claim 1, further comprising:
   a system bus coupling the processor to the accelerator.

7. A computing apparatus according to claim 1, wherein the configuration routine includes a routine that configures the queue size according to a message throughput of from the processor to the accelerator.

8. A computing apparatus according to claim 1, wherein the queue is allocated in an offscreen portion of a video memory storage.

9. A method of communicating messages from a processor to an accelerator using a software queue including:
   allocating a queue in a central storage that is coupled to the processor and controlled by the processor;
   establishing mutually exclusive access to the software queue to an application;
   determining a position in the queue for posting a message from the processor to the accelerator;
   posting the message to the queue from the processor via a bus without intermediate hardware FIFO buffering;
   waiting in the accelerator for a message to be posted in the queue; and
   performing, in the accelerator, the message posted in the queue.

10. A method according to claim 9, further comprising:
    writing a message into the queue at a position determined by a writepointer; and
    consuming a message from the queue at a position determined by a readpointer.

11. A method according to claim 10, further comprising:
    shadowing the writepointer in the processor.

12. A method according to claim 9, wherein determining the position in the queue comprises:
    comparing a value of a writepointer designating a position in the queue at which a message is posted to a value of a readpointer designating a position in the queue at which a message is consumed;

determining whether the queue is full or a queue entry is available on the basis of a result of the comparison;

allocating a position in the queue if a queue entry is available; and updating the value of a writepointer in accordance with the allocated position in the queue.

13. A method according to claim 9, wherein the message posting step comprises:

writing a value of a writepointer to a writepointer designating a position in the queue; and writing the message to the queue at the position designated by the writepointer.

14. A method according to claim 9, wherein waiting for a message to be posted in the queue further comprises:

monitoring a writepointer; and waiting until the writepointer changes value.

15. A method according to claim 9, further comprising:

initializing the queue.

16. A method according to claim 15, wherein initializing the queue further comprises:

initializing a thread executing on the accelerator including setting a location of the queue, initializing a readpointer register and initializing a writepointer register.

17. An article of manufacture comprising:

a non-volatile memory;

a plurality of instructional sections stored in the non-volatile memory, the instructional sections defining information relating to controlling a software queue for communicating information without intermediate hardware FIFO buffering from a processor to an accelerator;

a programmed executable code that controls the software queue and is executable on the processor and on the accelerator, the control programmed executable code further including:

a configuration routine allocating a queue within a central storage coupled to and controlled by the processor;

a message posting routine executing on the processor and writing a message to the queue without intermediate hardware FIFO buffering; and a message consuming routine executing on the accelerator, reading a message from the queue without intermediate hardware FIFO buffering, and activating the message for performance by the accelerator.

18. A computing apparatus comprising:

a processor;

an accelerator coupled to the processor;

a central storage coupled to the processor without intermediate hardware FIFO buffering and controlled by the processor, the central storage also being coupled to the accelerator without intermediate hardware FIFO buffering; and means for allocating a software queue in the storage;

means for establishing mutually exclusive access to the software queue to an application;

means for determining a position in the queue for posting a message from the processor to the accelerator;

means for posting the message to the queue from the processor via a bus without intermediate hardware FIFO buffering;

means for waiting in the accelerator for a message to be posted in the queue; and means for performing, in the accelerator, the message posted in the queue.

19. A computing apparatus according to claim 18, further comprising:

means for writing a message into the queue at a position determined by a writepointer; and means for consuming a message from the queue at a position determined by a readpointer.

20. A computing apparatus according to claim 18, further comprising:

means for shadowing the writepointer in the processor.

21. A computing apparatus according to claim 18, further comprising:

means for comparing a value of a writepointer designating a position in the queue for posting a message to a value of a readpointer designating a position in the queue for consuming a message;

means for determining whether the queue is full or a queue entry is available on the basis of a result of the comparison;

means for allocating a position in the queue if a queue entry is available; and means for updating the value of a writepointer in accordance with the allocated position in the queue.

22. A computing apparatus according to claim 18, further comprising:

means for writing a value of a writepointer to a writepointer designating a position in the queue; and means for writing the message to the queue at the position designated by the writepointer.

23. A computing apparatus according to claim 18, wherein the means for waiting for a message to be posted in the queue further comprises:

means for monitoring a writepointer; and means for waiting until the writepointer changes value.

24. A computing apparatus according to claim 18, further comprising:

means for initializing the queue.

25. A computing apparatus according to claim 18, wherein the means for initializing the queue further comprises:

means for initializing a thread executing on the accelerator including setting a location of the queue, initializing a readpointer and initializing a writepointer.

* * * * *